Figure 1:
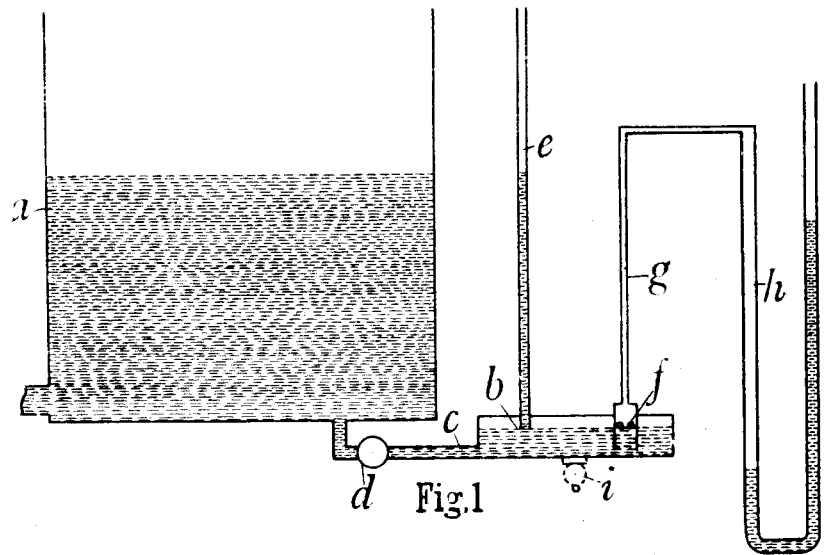

R. J. NASH AND G. H. ALEXANDER.
FLUID PRESSURE MEASURING INSTRUMENT.
APPLICATION FILED DEC. 17, 1918.

1,345,870.

Patented July 6, 1920.

2 SHEETS—SHEET 1.

Inventors
R. J. Nash
G. H. Alexander
By H. R. Kerslake
Atty.

R. J. NASH AND G. H. ALEXANDER.
FLUID PRESSURE MEASURING INSTRUMENT.
APPLICATION FILED DEC. 17, 1918.

1,345,870.

Patented July 6, 1920.
2 SHEETS—SHEET 2.

Inventors
R. J. Nash
G. H. Alexander
By R. R. Kerslake
Atty ic
UNITED STATES PATENT OFFICE.

ROBERT JOHN NASH AND GEORGE HENRY ALEXANDER, OF BIRMINGHAM, ENGLAND, ASSIGNORS TO THE A-N COMPANY LIMITED, OF BIRMINGHAM, ENGLAND.

FLUID-PRESSURE-MEASURING INSTRUMENT.

1,345,870.  Specification of Letters Patent.  Patented July 6, 1920.

Application filed December 17, 1918. Serial No. 267,216.

*To all whom it may concern:*

Be it known that we, ROBERT JOHN NASH, residing at 107 Bristol road, in the city of Birmingham, England, and GEORGE HENRY ALEXANDER, residing at 83-4 Coleshill street, in the city of Birmingham, England, subjects of the King of Great Britain and Ireland, have invented certain new and useful Improvements Relating to Fluid-Pressure-Measuring Instruments, of which the following is a specification.

This invention relates to fluid pressure measuring instruments of the type in which a fluid operated indicator or recorder can be arranged at a distance from the receptacle or conduit containing the fluid whose pressure is to be measured, and is separated therefrom by a region of entrapped air or other gas. In its rudimentary form such apparatus when employed, for example, for indicating the level of fluid in a tank, consists of a vessel (herein termed a displacement chamber) containing entrapped air or other gas, said vessel being in communication at its lower end with the lower end of the tank, and at its upper end with one end of a U-tube containing the indicating liquid. When the air in the tank is under pressure, the other end of the U-tube is connected to the air space in the tank, otherwise it is open to the atmosphere. Some arrangements hitherto proposed have been of little or no commercial value because the length or height of the displacement chamber has been made greater than the diameter. This involves comparatively large fluctuations of level (herein termed the datum level) in the displacement chamber and in consequence, especially when the air in the tank is put under variable pressure, it becomes impossible to accurately calibrate the U-tube in a manner which will suit all levels and pressures in the tank. A constant or practically constant datum level is essential to a successful instrument. This fact has previously been recognized and to enable a constant level to be insured the method has been employed of forcing compressed air into the displacement chamber to depress the datum level to a predetermined position before taking a reading on the U-tube.

The object of the present invention is primarily to enable a practically constant datum level to be obtained and conveniently restored when occasion requires in a very simple and convenient manner.

The invention comprises the combination with the displacement chamber, of a pipe which serves both to determine the datum level and also as a passage for air to or from the chamber for restoring such level when required.

In the two accompanying sheets of explanatory drawings:—

Figure 2:
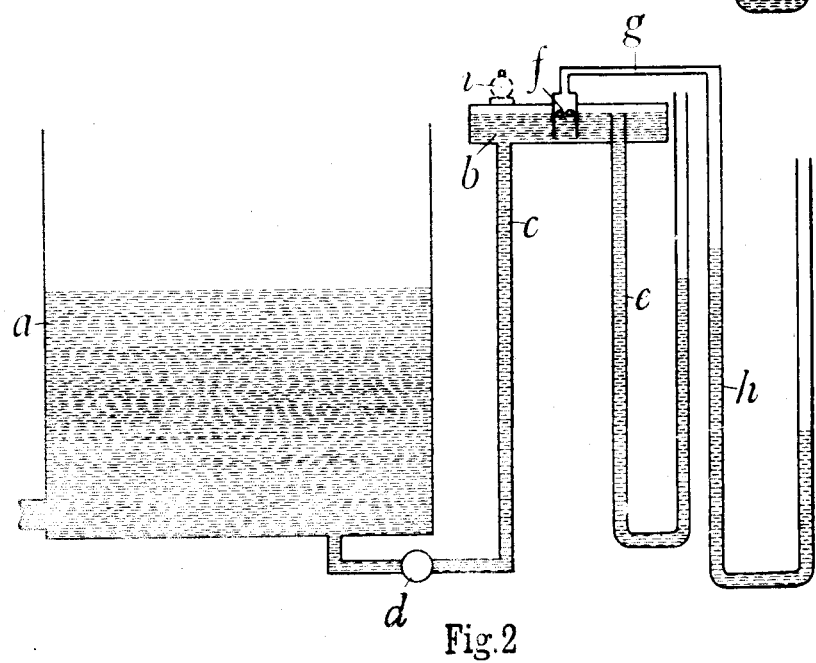
Figure 3:
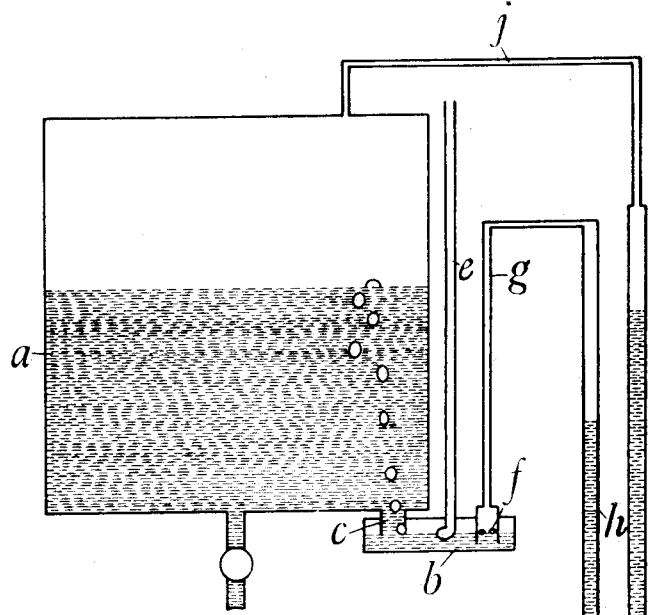

Figures 1 to 3 illustrate diagrammtically three applications of the invention.

The same reference letters in the different views indicate the same or similar parts.

In the application of the invention as shown in Fig. 1 to a fluid level indicator for use with a petrol or oil tank or receptacle $a$ on a motor vehicle, a shallow cylindrical or other air-tight displacement chamber $b$ is connected by a pipe $c$ to the under side of the tank so that the liquid can rise to a certain level in the chamber. This pipe may be opened or closed by a cock $d$. In the first instance air is forced out of the displacement chamber by the incoming liquid until the latter reaches the lower end of the vertical pipe $e$ projecting downwardly into the chamber. The liquid can then rise in the pipe to the same height as the level in the tank but can only rise farther in the chamber to a height determined by the head of liquid in the tank. Between the surface of the liquid and the upper side of the chamber $b$ is a region of entrapped air. The depth of this region is made as small as convenient compared with the diameter and volume of the region. Consequently large pressure differences in the chamber are accompanied by but small variations of the level. These variations are such that for practical purposes they can be disregarded and the level of the liquid can therefore be regarded as a constant datum level. Within the chamber is another chamber $f$ of relatively small diameter. This is open at its lower end to the liquid in the displacement chamber, and perforated at its upper end so as to be in communication with the air in the said chamber. From the smaller chamber a tube $g$ of fine bore is taken to one end of a U-tube $h$ containing the indicating liquid. The function of the smaller chamber is to avoid or minimize variation of the levels in the U-tube due to surging of the liquid in the displacement chamber, and splashing of liquid into the tube $g$. The volume of the connecting tube is small as compared with the volume of the air region in the displacement chamber so that the compression of air in the tube does not materially affect the datum level.

To compensate for absorption or leakage of air from the displacement chamber air can be blown in through the pipe $e$ periodically and restore the original datum level. Or air can be blown into the chamber through a cock $i$. Excess air then escapes through the pipe $e$. The latter thus serves both in determining and in restoring the datum level. It is also to be noted that the inner open end of the pipe $e$ is flush with the normal datum level of the chamber $b$ so that in case the level falls below normal it will be automatically returned to or constantly maintained normal by liquid flowing into the chamber from the tank $a$ while, if the datum level rises above normal, air may be blown into the pipe $e$ to restore the original datum level.

Although there is no indication when the level rises above the lower end of the tube $e$, when in use, air is periodically blown through the tube $e$ to insure that the datum level is correct. If at any time the observer is doubtful of his gage reading he just blows a small quantity of air through the tube $e$ so as to make sure that the datum level is correct.

The displacement chamber can be arranged in any position either below, above, or alongside the tank. When placed above the tank the entrapped air is subject to negative pressure and when placed below to positive pressure. This makes no difference to the operation of the indicator excepting that the readings are taken the one case in one limb of the U-tube and in the other in the opposite limb. An arrangement of the displacement chamber above the tank is shown in Fig. 2. In this case the tube $e$ is in the form of a U-tube connected as shown to the underside of the part $b$. Leakage of air into the chamber tends to increase the volume of air in $b$ and consequently the datum level. To restore the level air is sucked out through the pipe $e$ or through a cock $i$.

A useful arrangement in which the displacement chamber is arranged in conjunction with a closed tank $a$ is shown in Fig. 3. With such a tank it is necessary to supply air to the same to maintain a constant air pressure therein. For this purpose the tank is connected to the displacement chamber by a short vertical pipe $c$. Air is admitted by the pipe $e$.

The end of the gage which in the other forms is open is connected by a small diameter pipe $j$ to the tank air space. Assuming the liquid to be withdrawn from the tank under gravity a reduction of air pressure will occur and cause the level in $e$ to fall. When a certain pressure is reached air will pass down the tube $e$ and finding its way to the tank as shown by the bubbles in the diagram will restore the air pressure and simultaneously maintain the full quantity of air required in $b$. If the liquid is forced from the tank by air pressure the air necessary for maintaining the pressure on the upper surface of the liquid in $a$ is supplied through $b$. Air is admitted to the tank in a similar manner when the liquid is withdrawn by a suction pump.

The invention is not limited to the arrangements herein described, nor to any constructional details as these may be widely varied to meet different requirements.

Having thus described our invention what we claim as new and desire to secure by Letters Patent is:—

In fluid pressure measuring instruments, the combination comprising a closed displacement chamber in communication with a body of fluid and containing a quantity of entrapped air, the height of the air space above the fluid datum level in the chamber being small relatively to the diameter of the chamber, a fluid gage communicating at one end with the air space in the displacement chamber, and a pipe in communication with the fluid in said chamber, said pipe serving to determine the datum level and also as a passage for air to or from the chamber for restoring such level when required, substantially as described.

In testimony whereof we have signed our names to this specification.

ROBERT JOHN NASH.
GEORGE HENRY ALEXANDER.